US007233281B1

(12) United States Patent
Chou

(10) Patent No.: US 7,233,281 B1
(45) Date of Patent: Jun. 19, 2007

(54) GROUP GLOBAL POSITIONING SYSTEM

(75) Inventor: Ping-Hsiang Chou, Taoyuan (TW)

(73) Assignee: Mitac International Corporation, Taoyuan (TW)

( * ) Notice: Subject to any disclaimer, the term of this patent is extended or adjusted under 35 U.S.C. 154(b) by 0 days.

(21) Appl. No.: 11/533,689

(22) Filed: Sep. 20, 2006

(30) Foreign Application Priority Data

Jun. 12, 2006 (TW) .............................. 95120790 A

(51) Int. Cl.
*G01S 5/14* (2006.01)

(52) U.S. Cl. ........................... 342/357.09; 342/357.08; 342/357.1

(58) Field of Classification Search . 342/357.08–357.1
See application file for complete search history.

(56) References Cited

U.S. PATENT DOCUMENTS

| | | | | |
|---|---|---|---|---|
| 5,848,373 A * | 12/1998 | DeLorme et al. | ...... | 342/357.13 |
| 5,878,369 A * | 3/1999 | Rudow et al. | ......... | 342/357.08 |
| 6,246,376 B1 * | 6/2001 | Bork et al. | ............ | 342/357.13 |
| 6,314,366 B1 * | 11/2001 | Farmakis et al. | ........ | 342/357.1 |
| 6,373,430 B1 * | 4/2002 | Beason et al. | ......... | 342/357.09 |
| 6,430,498 B1 * | 8/2002 | Maruyama et al. | .... | 342/357.08 |
| 2004/0046693 A1 * | 3/2004 | Ogino et al. | ........... | 342/357.08 |

OTHER PUBLICATIONS

The Personal Handy Phone System in Japan's Wireless Communication Market, Hewlett Packard Application Note, 1996.*

* cited by examiner

*Primary Examiner*—Thomas H. Tarcza
*Assistant Examiner*—F H Mull

(57) ABSTRACT

A group global positioning system includes a plurality of positioning signal processing devices with a global positioning function and a plurality of radio signal processing devices corresponding to the positioning signal processing devices. With one of the corresponding radio signal processing devices, one of the positioning signal processing devices outputs analog global positioning information to the remaining ones of the positioning signal processing devices which then performs analog-to-digital conversion on the analog global positioning information and recovers digital global positioning information, thus allowing the remaining ones of the positioning signal processing devices to execute the global positioning function and display related information. The present invention discloses a grouping technique for simultaneously displaying on the positioning signal processing devices the digital global positioning information thereof.

9 Claims, 1 Drawing Sheet

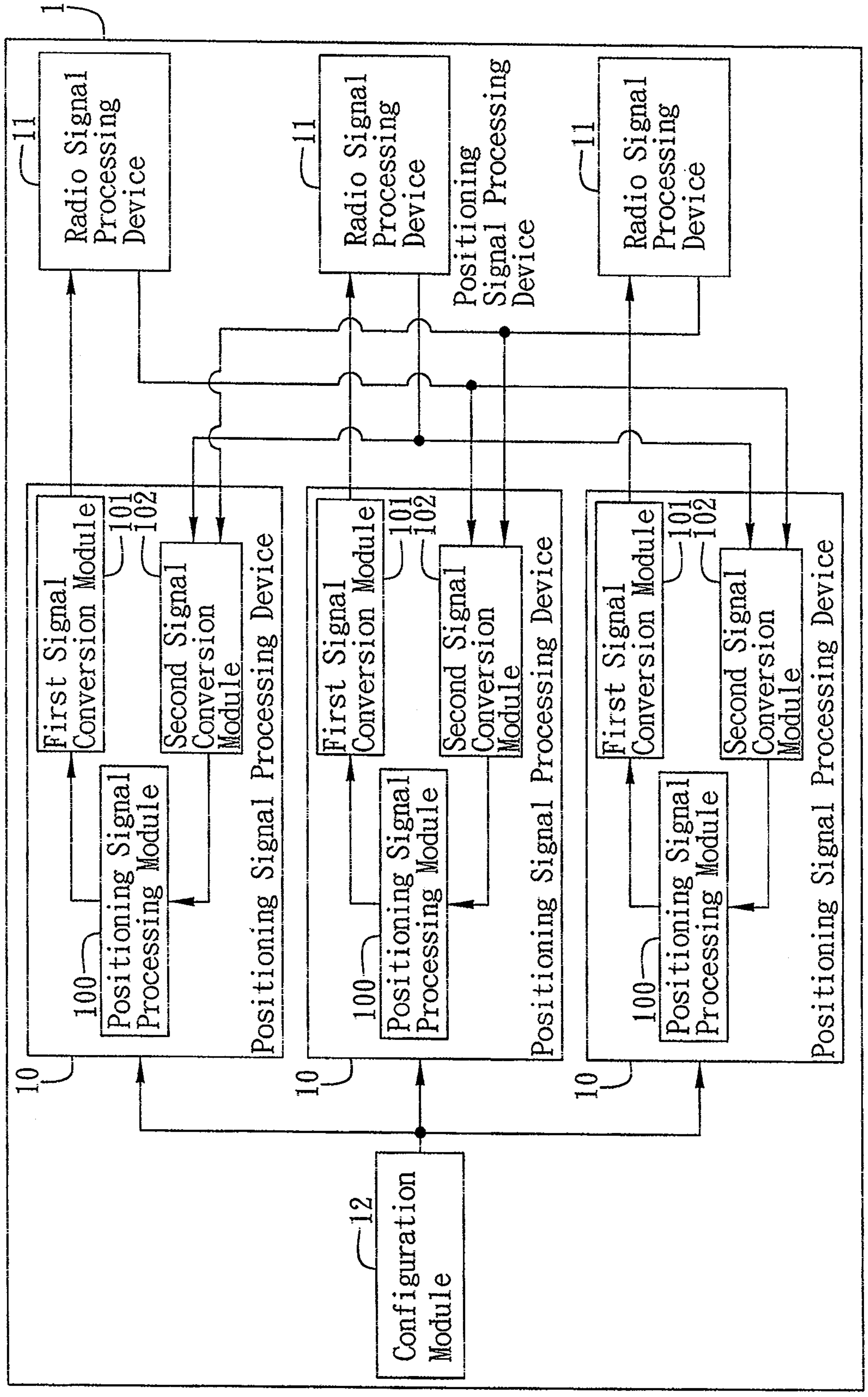
1
11
Radio Signal Processing Device
11
Radio Signal Processing Device
Positioning Signal Processing Device
11
Radio Signal Processing Device
First Signal Conversion Module
101
102
Second Signal Conversion Module
Positioning Signal Processing Module
100
Positioning Signal Processing Device
10
12
Configuration Module

GROUP GLOBAL POSITIONING SYSTEM

BACKGROUND OF THE INVENTION

1. Field of the Invention

The present invention relates to global positioning systems, and more particularly, to a group global positioning system.

2. Description of the Prior Art

A global positioning system (GPS) is typically used for performing a positioning operation. The positioning operation involves comparing geographic location coordinates with road/street data stored in a road/street database (i.e. e-maps), calculating the data related to a road/street where a portable electronic device is presently located and the data related to the actual geographic location of the portable electronic device, and displaying the data. Global positioning systems nowadays are widely used in vehicle-oriented road/street positioning devices for positioning any moving vehicle. The positioning function of the global positioning systems is increasingly integrated into portable electronic devices like cellular phones and PDAs.

Nevertheless, the aforesaid positioning function configured for just a single tool is never adequate to meet a need. For instance, if a member of a group tour of sparsely populated places (for example, deserts and mountains) lags behind her or his fellow tour members, the slow tour member can identify her or his own geographic location, using an electronic device with a positioning function, but s/he will not be able to know the geographic location of her or his fellow tour members, and in consequence s/he will be prevented from hurrying to catch up. On the other hand, her or his fellow tour members fail to lend a helping hand to the slow tour member, as they have no idea about the slow tour member's current geographic location. Another problem is that a tour organizer is ignorant of the current geographic location of individual tour members, and thus the tour organizer fails to know whether the group tour is underway as scheduled.

Accordingly, an issue calling for urgent action is related to development of a global positioning technology to overcome the aforesaid drawbacks of the prior art.

SUMMARY OF THE INVENTION

In light of the aforesaid drawbacks of the prior art, it is a primary objective of the present invention to provide a group global positioning system whereby a member of a group is informed of her or his fellow group members' geographic locations.

Another objective of the present invention is to provide a group global positioning system to facilitate a group activity.

In order to achieve the above and other objectives, the present invention provides a group global positioning system. The group global positioning system comprises a plurality of positioning signal processing devices and a plurality of radio signal processing devices. The positioning signal processing devices have a global positioning function and each comprise a positioning signal processing module for executing the global positioning function and receiving digital global positioning information sent by a satellite while executing the global positioning function, a first signal conversion module for performing digital-to-analog conversion on the digital global positioning information and outputting analog global positioning information, and a second signal conversion module for performing analog-to-digital conversion. The radio signal processing devices correspond to the positioning signal processing devices and output, by radio transmission, the analog global positioning information outputted by the first signal conversion module. With one of the corresponding radio signal processing devices, one of the positioning signal processing devices sends to the remaining ones of the positioning signal processing devices the analog global positioning information outputted by the first signal conversion module, allowing the second signal conversion module of the remaining ones of the positioning signal processing devices to perform the analog-to-digital conversion on the analog global positioning information and recover the digital global positioning information, thus enabling the positioning signal processing module of the remaining ones of the positioning signal processing devices to execute the global positioning function and display related information.

In the preferred embodiment of the present invention, the positioning signal processing devices are selected from the group consisting of personal digital assistants (PDAs), cellular phones, and computers, all of which are installed with navigator software which supports a global positioning system (GPS). The digital global positioning information comprises a geographic location message. The positioning signal processing module is a global positioning system module (GPS module). The first signal conversion module is a digital-to-analog converter (D/A converter). The second signal conversion module is an analog-to-digital converter (A/D converter). The radio signal processing devices are radio communication devices which comprise a radio module each.

Compared to the prior art, the group global positioning system of the present invention works as follows. With one of the corresponding radio signal processing devices, one of the positioning signal processing devices outputs analog global positioning information to the remaining ones of the positioning signal processing devices, allowing the remaining ones of the positioning signal processing devices to perform the analog-to-digital conversion on the analog global positioning information and recover the digital global positioning information, thus enabling the remaining ones of the positioning signal processing devices to execute the global positioning function and display related information. Accordingly, with the group global positioning system of the present invention, a member of a group can be informed of her or his fellow members' geographic locations such that a group activity is well-coordinated and well-controlled, thus preventing the group members from falling behind or getting lost.

BRIEF DESCRIPTION OF THE DRAWING

The FIGURE is a functional block diagram of a group global positioning system of the preferred embodiment according to the present invention.

DETAILED DESCRIPTION OF THE PREFERRED EMBODIMENT

The present invention is herein illustrated with a specific embodiment so that one skilled in the pertinent art can easily understand other advantages and effects of the present invention from the disclosure of the invention.

Referring to the FIGURE, which is a functional block diagram of a group global positioning system 1 of the preferred embodiment according to the present invention. The group global positioning system 1 comprises a plurality of positioning signal processing devices 10, a plurality of radio signal processing devices 11 corresponding to the positioning signal processing devices 10, and a configuration module 12. The number of the positioning signal processing devices 10 may vary if necessary. The number of the radio signal processing devices 11 equals the number of the positioning signal processing devices 10. In the preferred embodiment, the number of the positioning signal processing devices 10 and that of the radio signal processing devices 11 are three, but the quantity of the positioning signal processing devices 10 and that of the radio signal processing devices 11 in practice should not be limited by the preferred embodiment.

The details of the group global positioning system 1 of the present invention are as follows: The positioning signal processing devices 10 have a global positioning function and each comprise a positioning signal processing module 100 for executing the global positioning function and receiving digital global positioning information sent by a satellite while executing the global positioning function, a first signal conversion module 101 for performing digital-to-analog conversion on the digital global positioning information and outputting analog global positioning information, and a second signal conversion module 102 for performing analog-to-digital conversion. In the preferred embodiment, the positioning signal processing devices 10 are selected from the group consisting of personal digital assistants (PDAs), cellular phones and computers, all of which are installed with navigator software which supports a global positioning system (GPS). The digital global positioning information comprises a geographic location message. The positioning signal processing module 100 is a global positioning system module (GPS module). The first signal conversion module 101 is a digital-to-analog converter (D/A converter). The second signal conversion module 102 is an analog-to-digital converter (A/D converter). The radio signal processing devices 11 correspond to the positioning signal processing devices 10 and output, by radio transmission, the analog global positioning information outputted by the first signal conversion module 101. The radio signal processing devices 11 are radio communication devices which comprise a radio module each.

The positioning signal processing devices 10 have a global positioning function and each comprise a positioning signal processing module 100 for executing the global positioning function and receiving digital global positioning information sent by a satellite while executing the global positioning function, a first signal conversion module 101 for performing digital-to-analog conversion on the digital global positioning information and outputting analog global positioning information, and a second signal conversion module 102 for performing analog-to-digital conversion. In the preferred embodiment, the positioning signal processing devices 10 are selected from the group consisting of personal digital assistants (PDAs), cellular phones and computers, all of which are installed with navigator software which supports a global positioning system (GPS). The digital global positioning information comprises a geographic location message. The positioning signal processing module 100 is a global positioning system module (GPS module). The first signal conversion module 101 is a digital-to-analog converter (D/A converter). The second signal conversion module 102 is an analog-to-digital converter (A/D converter). The radio signal processing devices 11 correspond to the positioning signal processing devices 10 and output, by radio transmission, the analog global positioning information outputted by the first signal conversion module 101. The radio signal processing devices 11 are radio communication devices which comprise a radio module each.

In this embodiment, with one of the corresponding radio signal processing devices 11, one of the positioning signal processing devices 10 sends to the remaining ones of the positioning signal processing devices 10 the analog global positioning information outputted by the first signal conversion module 101, allowing the second signal conversion module 102 of the remaining ones of the positioning signal processing devices 10 to perform the analog-to-digital conversion on the analog global positioning information and recover the digital global positioning information, thus enabling the positioning signal processing module 100 of the remaining ones of the positioning signal processing devices 10 to execute the global positioning function and display related information.

The configuration module 12 varies the quantity and/or an attribute, such as authority, of the positioning signal processing devices 10 when necessary. For instance, setting the default ones of the positioning signal processing devices 10 for receiving analog global positioning information outputted by all or part of the positioning signal processing devices 10.

In order to apply the principle and enhance the performance of the present invention further, the positioning signal processing devices 10 of the present invention comprise a first cellular phone, a second cellular phone, a third cellular phone, the positioning signal processing module 100, the first signal conversion module 101, and the second signal conversion module 102. The first, second and third cellular phones are each installed with navigator software which supports a global positioning system (GPS). The positioning signal processing module 100 is the global positioning system module (GPS module). The first signal conversion module 101 is the digital-to-analog converter (D/A converter). The second signal conversion module 102 is the digital-to-analog converter (A/D converter). The group global positioning system of the present invention is illustrated with a scenario where a group of three equipped with the first, second and third cellular phones carry out an expedition outdoors. First, the configuration module 12 configures and allows the first, second and third cellular phones to receive analog global positioning information from each other. Where the first cellular phone-carrying member falls behind for whatever reasons, with one of the corresponding radio signal processing devices 11, the first cellular phone sends to the remaining ones of the positioning signal processing devices 10 (the second and third cellular phones) the analog global positioning information outputted by the first signal conversion module 101, allowing the second signal conversion module of the remaining ones of the positioning signal processing devices 10 (the second and third cellular phones) to perform the analog-to-digital conversion on the analog global positioning information and recover the digital global positioning information, thus enabling the positioning signal processing module 102 of the remaining ones of the positioning signal processing devices 10 (the second and third cellular phones) to execute the global positioning function and display related information.

The second cellular phone-carrying member and the third cellular phone-carrying member are informed of the first cellular phone-carrying member's geographic location and thereby allowed to make a response, for example, proceeding, but more slowly than before, such that the first cellular phone-carrying member can catch up; meanwhile, the first, second and third cellular phone-carrying members may communicate with each other through the radio signal processing devices 11. By the same token, the first cellular phone-carrying member is informed of the first and second cellular phone-carrying members' geographic location, and thus the first cellular phone-carrying member may hurry to catch up.

In summary, a group global positioning system of the present invention comprise a plurality of positioning signal processing devices and a plurality of radio signal processing devices corresponding thereto. With one of the corresponding radio signal processing devices, one of the positioning signal processing devices outputs analog global positioning information to the remaining ones of the positioning signal processing devices, allowing the remaining ones of the positioning signal processing devices to perform analog-to-digital conversion on the analog global positioning information and recover digital global positioning information, thus enabling the remaining ones of the positioning signal processing devices to execute the global positioning function and display related information. Accordingly, with the group global positioning system of the present invention, a member of a group can be informed of her or his fellow members' geographic locations such that a group activity is well-coordinated and well-controlled, thus preventing the group members from falling behind or getting lost.

The aforesaid embodiment merely serves as the preferred embodiment of the present invention. It should not be construed as to limit the scope of the present invention in any way. Hence, any other changes can actually be made in the present invention. It will be apparent to those skilled in the art that all equivalent modifications or changes made, without departing from the spirit and the technical concepts disclosed by the present invention, should fall within the scope of the appended claims.

What is claimed is:

1. A group global positioning system, comprising:

a plurality of positioning signal processing devices with a global positioning function, each comprising a positioning signal processing module for executing the global positioning function and receiving digital global positioning information sent by a satellite while executing the global positioning function, a first signal conversion module for performing digital-to-analog conversion on the digital global positioning information and outputting analog global positioning information, and a second signal conversion module for performing analog-to-digital conversion;

a plurality of radio signal processing devices corresponding to the positioning signal processing devices and outputting, by radio transmission, the analog global positioning information outputted by the first signal conversion module; and a configuration module, varying a quantity and an attribute of the positioning signal processing devices;

wherein, with one of the corresponding radio signal processing devices, one of the positioning signal processing devices sends to the remaining ones of the positioning signal processing devices the analog global positioning information outputted by the first signal conversion module, allowing the second signal conversion module of the remaining ones of the positioning signal processing devices to perform the analog-to-digital conversion on the analog global positioning information and recover the digital global positioning information, thus enabling the positioning signal processing module of the remaining ones of the positioning signal processing devices to execute the global positioning function and display related information.

2. The group global positioning system of claim 1, wherein the positioning signal processing devices are selected from the group consisting of personal digital assistants (PDAs), cellular phones, and computers, all of which are installed with navigator software which supports a global positioning system (GPS).

3. The group global positioning system of claim 1, wherein the digital global positioning information comprises geographic information.

4. The group global positioning system of claim 1, wherein the positioning signal processing module is a global positioning system module (GPS module).

5. The group global positioning system of claim 1, wherein the first signal conversion module is a digital-to-analog converter (D/A converter).

6. The group global positioning system of claim 1, wherein the second signal conversion module is an analog-to-digital converter (A/D converter).

7. The group global positioning system of claim 1, wherein the radio signal processing devices are radio communication devices.

8. The group global positioning system of claim 7, wherein the radio communication devices comprise a radio module each.

9. The group global positioning system of claim 1, wherein the attribute is that the quantity of positioning signal processing devices are set for receiving the analog global positioning information output by part of the positioning signal processing devices.

* * * * *